(12) United States Patent
Suddaby

(10) Patent No.: US 12,196,173 B2
(45) Date of Patent: Jan. 14, 2025

(54) SEGMENTED DRIVESHAFT

(71) Applicant: Loubert S. Suddaby, Orchard Park, NY (US)

(72) Inventor: Loubert S. Suddaby, Orchard Park, NY (US)

( * ) Notice: Subject to any disclaimer, the term of this patent is extended or adjusted under 35 U.S.C. 154(b) by 0 days.

(21) Appl. No.: 18/325,033

(22) Filed: May 29, 2023

(65) Prior Publication Data
US 2023/0296074 A1    Sep. 21, 2023

Related U.S. Application Data

(62) Division of application No. 17/227,491, filed on Apr. 12, 2021, now Pat. No. 11,754,035.

(51) Int. Cl.
F03B 13/26    (2006.01)

(52) U.S. Cl.
CPC ......... F03B 13/262 (2013.01); *F05B 2210/11* (2013.01); *F05B 2240/30* (2013.01)

(58) Field of Classification Search
CPC ...... F03B 13/26; F03B 13/264; F03B 13/262; F03B 13/268; F05B 2220/11; F05B 2240/30; F05B 2260/70; F05B 2260/71; F05B 2260/74; F05B 2260/75; F05B 2260/78; F16C 3/02; F16C 3/023
See application file for complete search history.

(56) References Cited

U.S. PATENT DOCUMENTS

| | | | |
|---|---|---|---|
| 2,590,169 A * | 3/1952 | Fritz | F16C 3/023 464/97 |
| 4,832,571 A | 5/1989 | Carrol | |
| 6,371,726 B1 | 4/2002 | Jonsson | |
| 7,855,468 B2 | 12/2010 | Lin | |
| 8,664,791 B2 * | 3/2014 | Rebsdorf | F03D 15/00 290/55 |
| 8,664,792 B2 | 3/2014 | Rebsdorf | |
| 9,279,333 B2 | 3/2016 | Murdoch | |
| 9,777,764 B2 * | 10/2017 | Lee | F16D 1/068 |
| 10,947,825 B1 * | 3/2021 | Dreher | F04B 47/14 |
| 10,965,525 B1 * | 3/2021 | Frink | H04L 41/5041 |

(Continued)

FOREIGN PATENT DOCUMENTS

| | | |
|---|---|---|
| CN | 201177015 | 1/2009 |
| CN | 201671755 | 12/2010 |

(Continued)

OTHER PUBLICATIONS

Russian Patent Office (ISA/RU), International Search Report and Written Opinion of the ISA from International Application No. PCT/US2022/070656, mailed May 12, 2022.

*Primary Examiner* — David E Sosnowski
*Assistant Examiner* — Maxime M Adjagbe
(74) *Attorney, Agent, or Firm* — Harter Secrest & Emery LLP; Michael Nicholas Vranjes

(57) ABSTRACT

A driveshaft, including a first segment, including a first end, a second end, a first through-bore extending from the first end to the second end, and a first protrusion extending axially from the second end, and a second segment, including a third end including a first notch, and a fourth end, and a first hole extending from the third end and aligned with the first through-bore, wherein the first protrusion engages the first notch to non-rotatably connect the first segment and the second segment.

20 Claims, 8 Drawing Sheets

(56) References Cited

U.S. PATENT DOCUMENTS

| | | | |
|---|---|---|---|
| 2010/0301609 A1 | 12/2010 | Kim et al. | |
| 2016/0218592 A1* | 7/2016 | Huang | F03B 13/264 |
| 2016/0281830 A1* | 9/2016 | Sekiguchi | F16H 45/02 |
| 2020/0016001 A1* | 1/2020 | McDonell | A61F 9/00763 |

FOREIGN PATENT DOCUMENTS

| | | |
|---|---|---|
| CN | 205315202 | 6/2016 |
| DE | 4122771 | 1/1993 |
| DE | 19633590 | 3/1999 |
| DE | 102015217068 | 3/2017 |
| EP | 2299107 | 3/2011 |
| EP | 2935881 | 10/2015 |
| FR | 2980245 | 3/2013 |
| GB | 2472625 | 2/2011 |
| GB | 2531596 | 4/2016 |
| JP | S62284967 | 12/1987 |
| KR | 20070116577 | 12/2007 |
| KR | 20100038973 | 4/2010 |
| KR | 101335336 | 12/2013 |
| KR | 101626392 | 6/2016 |
| RU | 186893 | 2/2019 |
| WO | 2004051079 | 6/2004 |
| WO | 2008093037 | 8/2008 |
| WO | 2012048523 | 4/2012 |
| WO | 2014096841 | 6/2014 |
| WO | 2014194443 | 12/2014 |
| WO | 2015016703 | 2/2015 |

\* cited by examiner

SEGMENTED DRIVESHAFT

CROSS-REFERENCE TO RELATED APPLICATIONS

This application is filed under 35 U.S.C. § 120 as a divisional of U.S. patent application Ser. No. 17/227,491, filed on Apr. 12, 2021, which application is incorporated by reference in its entirety.

FIELD

The present disclosure relates to energy capture devices, and more particularly, to an energy capture device that utilizes an oscillating fluid to generate electrical energy.

BACKGROUND

The moon's gravitational pull on water bodies creates tides. In turn, this movement creates kinetic energy that is carried by the water. Anything that moves has kinetic energy, whether it's wind or a ball rolling down a hill. Kinetic energy can be captured by humans through windmills and water mills. Researchers are trying to tap into the power of the tides through a design similar to a windmill. Underwater (or tidal) turbines are a fairly straightforward concept, as far as cutting-edge energy technology goes. They are essentially windmills installed onto an ocean floor or riverbed. The underwater current produced by the tides spins blades arranged like an airplane propeller. These turbines are attached to a gear box, which is connected to an electrical generator. This produces the electricity that is carried by cable to shore. Once it's plugged into an electrical grid, the electricity can be distributed.

Although underwater turbines are essentially the same thing as windmills, they have a few advantages over their above-ground cousins. Windmills require land, especially wind farms (i.e., dozens or hundreds of windmills). The future of land use (how land is developed and what it's used for) is becoming a major topic of discussion. With 6 billion people on the planet and counting, space is at a premium-not just for housing, but for crop production and more. Underwater turbines overcome this problem. Another advantage of underwater energy capture comes from water's high density. Water is denser than air, which means that the same amount of energy can be produced by an underwater turbine as a windmill, but at slower speeds and over less area. Further, while the amount of wind that passes over any given area of land can be unpredictable, the kinetic energy of tidal areas is dependable. The ebb and flow is so predictable, a given tidal region can be expressed in the amount of kilowatt hours of electricity it can produce per turbine.

Scientists have been examining the amount of energy found in a tidal pool in monthlong periods. There are two main measurements. Mean spring peak velocity is the highest velocity of tidal movement that can be found in an area during a single month. Mean neap peak cycle is the lowest point in velocity that a tidal area experiences in a month. These two measurements can help approximate the greatest and least amounts of velocity found in any given tidal pool over the course of a month. Besides the tides, there are other characteristics that affect the velocity of water. For example, the surrounding terrain, or whether the area is rocky or sandy, determines how water moves. Whether a tidal area is narrow or wide can also impact velocity. A narrow channel can concentrate water's movement, causing it to speed up.

However, current underwater turbines have many drawbacks. For example, current designs only capture energy via tidal movement in a single direction. Thus, only one of the ebb and flow would create rotational displacement of the underwater turbine. Additionally, underwater turbines are difficult to service in case of equipment failure. Furthermore, current blade/propeller designs may put a tremendous amount of stress and/or strain on the driveshaft to which it is connected, making the driveshaft susceptible to failure.

A popular unidirectional turbine called the Wells turbine is frequently used for unidirectional rotation in an oscillating fluid environment. Its fixed shaft blades require a particular blade shape and angulation to permit unidirectional rotation. This fixed requirement of blade design significantly compromises the amount of kinetic energy that can be captured and impedes the efficiency of that achieved by blades that can be contoured or angulated to address issues pertaining to maximal energy capture.

Thus, there is a long felt need for an oscillating fluid energy capturing assembly arranged to capture the flow of fluid in multiple directions without the need for repositioning. Also, there is a long felt need for a torque vibration damping system using a segmented driveshaft assembly to reduce the risk of driveshaft failure in high torque settings.

SUMMARY

According to aspects illustrated herein, there is provided a driveshaft, comprising a first segment, including a first end, a second end, a first through-bore extending from the first end to the second end, and a first protrusion extending axially from the second end, and a second segment, including a third end comprising a first notch, and a fourth end, and a first hole extending from the third end and aligned with the first through-bore, wherein the first protrusion engages the first notch to non-rotatably connect the first segment and the second segment.

In some embodiments, the first notch comprises at least one dampener that radially surrounds the engaged first protrusion. In some embodiments, the second segment further comprises a second hole extending from the fourth end. In some embodiments, the second segment further comprises a female connector arranged in the second hole. In some embodiments, the driveshaft further comprises a connector shaft engaged with the female connector. In some embodiments, the connector shaft is operatively arranged to non-rotatably connect the second segment to one or more propeller blades or a gear train. In some embodiments, the driveshaft further comprises a dampener segment arranged circumferentially around the connector shaft, the dampener segment comprising a fifth end and a sixth end. In some embodiments, the fifth end abuts against the fourth end.

In some embodiments, the driveshaft further comprises a guide shaft engaged with the first through-bore and the first hole. In some embodiments, the first notch extends radially outward from the first hole. In some embodiments, the first notch extends axially from the third end. In some embodiments, the first notch comprises a first surface and a second surface opposite the first surface, a first dampener is arranged on the first surface, and a second dampener is arranged on the second surface. In some embodiments, the first dampener and the second dampener provide radial dampening between the first protrusion and the first notch. In some embodiments, the at least one dampener comprises an elastomer. In some embodiments, the at least one dampener comprises a polymer. In some embodiments, the driveshaft further comprises a third segment including a fifth end, a sixth end, a second through-bore extending from the fifth end to the sixth end, and a second protrusion extending axially from the sixth end, wherein the second protrusion engages a second notch in the first end to non-rotatably connect the third segment to the first segment.

According to aspects illustrated herein, there is provided a driveshaft comprising a first segment, including a first end, a second end, a first through-bore extending from the first end to the second end, and a first protrusion extending axially from the second end, and a second segment, including a third end comprising a first notch, and a fourth end, and a first hole extending from the third end and aligned with the first through-bore, wherein the first protrusion engages the first notch to non-rotatably connect the first segment and the second segment, and the first notch comprises at least one dampener that radially surrounds the engaged first protrusion.

In some embodiments, the driveshaft further comprises a connector shaft non-rotatably engaged with the fourth end. In some embodiments, the driveshaft further comprises a dampener segment arranged circumferentially around the connector shaft, the dampener segment comprising a fifth end abutting against the fourth end and a sixth end. In some embodiments, the driveshaft further comprises a guide shaft engaged with the first through-bore and the first hole.

According to aspects illustrated herein, there is provided an oscillating fluid energy capturing assembly, comprising at least one hinged propeller assembly, each hinged propellor assembly of the at least one hinged propeller assembly including a driveshaft including a first end and a second end, a first plurality of blades pivotably connected to the first end, and a second plurality of blades pivotably connected to the second end.

In some embodiments, the first plurality of blades fold radially inward in a first axial direction from a first deployed position to a first retracted position, and the second plurality of blades fold radially inward in a second axial direction, opposite the first axial direction, from a second deployed position to a second retracted position. In some embodiments, fluid flowing in the first axial direction engages the second plurality of blades causing the driveshaft to displace in a first circumferential direction, and the fluid flow in the second axial direction engages the first plurality of blades causing the driveshaft to displace in the first circumferential direction. In some embodiments, at least one blade of the first plurality of blades and the second plurality of blades comprises a flared section, the flared section being curvilinear. In some embodiments, at least one blade of the first plurality of blades and the second plurality of blades is connected to a biasing element.

In some embodiments, the oscillating fluid energy capturing assembly further comprises a tube, wherein the at least one hinged propeller assembly is arranged in the tube. In some embodiments, the tube comprises a first section forming an opening and a second section fluidly connected to the first section. In some embodiments, the first section is arranged substantially horizontal and the second section is arranged substantially vertically. In some embodiments, the at least one hinged propeller assembly is arranged in the second section. In some embodiments, the tube is arranged on a turntable.

In some embodiments, the driveshaft comprises a first segment, and a second segment non-rotatably engaged with the first segment. In some embodiments, one of the first segment and the second segment comprises one or more axially extending protrusions, the other of the first segment and the second segment comprises one or more notches, and the one or more axially extending protrusions engage the one or more notches to non-rotatably connect the first segment and the second segment. In some embodiments, at least one of the one or more notches comprises at least one dampener that radially surrounds the engaged protrusion. In some embodiments, the driveshaft further comprises a connector engaged with a female connector of the second segment, the connector operatively arranged to non-rotatably connect the second connector to the first plurality of blades. In some embodiments, the driveshaft further comprises a dampener arranged circumferentially around the connector.

According to aspects illustrated herein, there is provided an oscillating fluid energy capturing assembly, comprising a driveshaft, including a first segment comprising an axially extending protrusion, and a second segment comprising an axially extending notch, wherein the axially extending protrusion engages the axially extending notch to non-rotatably connect the first segment and the second segment, and a first plurality of blades connected to one of the first segment and the second segment.

In some embodiments, the oscillating fluid energy capturing assembly further comprises a second plurality of blades, wherein the first plurality of blades is hingedly connected to the first segment and the second plurality of blades is hingedly connected to the second segment. In some embodiments, the notch comprises at least one dampener arranged radially adjacent the protrusion. In some embodiments, the oscillating fluid energy capturing assembly further comprises a tube, wherein the driveshaft and the first plurality of blades are arranged in the tube. In some embodiments, the tube comprises a first horizontal section forming an opening and a second vertical section fluidly connected to the first section, the driveshaft and the first plurality of blades being arranged in the second section.

According to aspects illustrated herein, there is provided an assembly for capturing oscillating fluid energy and a hinged propeller shaft assembly that is arranged to capture fluid movement (e.g., liquid), in at least two opposite directions. Generally, the assembly comprises a shaft, a first propeller connected to a first end of the shaft and foldable (hinged) in a first direction, and a second propeller connected to a second end of the shaft and foldable (hinged) in a second direction. As fluid moves in a first axial direction, the first propeller is opened and rotates the shaft in a first circumferential direction while the second propeller closes. When the fluid changed direction and moves in the second axial direction, opposite the first axial direction, the second propeller opens and rotates the shaft in the first circumferential direction while the first propeller closes.

In some embodiments, the hinged propeller assembly is arranged in a tube or column, in which water or fluid changes direction. Water is pumped or forced into the tube, moving past the one or more propeller assemblies in a first direction. Then water flows back down the tube moving past the one or more propeller assemblies in a second direction. The water rotates the propellers as it moves in both the first and second directions.

In some embodiments, the propeller blades include slight flairs on their ends to assist in the hinged motion (i.e., opening and closing relative to the fluid displacement direction). The assembly may also have springs or biasing elements that assist the propellers in opening/closing.

According to aspects illustrated herein, there is provided a rotational segmented driveshaft that prevents and/or reduces significant torque stress and strain caused by large gusts of wind that result in the shaft breaking and thus expensive repairs. The segmented driveshaft may be used for wind-turbine propellers, water turbine propellers, or other shafts that incur substantial random high torsional force. In some embodiments, a first end of the segmented driveshaft is connected to a main axel (of the blades) by way of a poly axial connector. The connection may be made via a shaft that is entirely surrounded by a dampener. In some embodiments, the shaft is connected to the first segment via a Philips screwdriver-like connection. The shaft itself is segmented and has a plurality of segments that have a puzzle-like keyed fit for each respective end. All of the key-fits are encased/covered by dampers. The key-fit connecting segments comprise a rubber-like material, encouraging some give when additional torque is applied to the shaft from a sudden gust of wind or water. The additional give between segments relieves torque and helps prevent breaking or snapping of the shaft. In some embodiments, the segmented sections all have a through-bore that is arranged to accept a guide shaft.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1A:
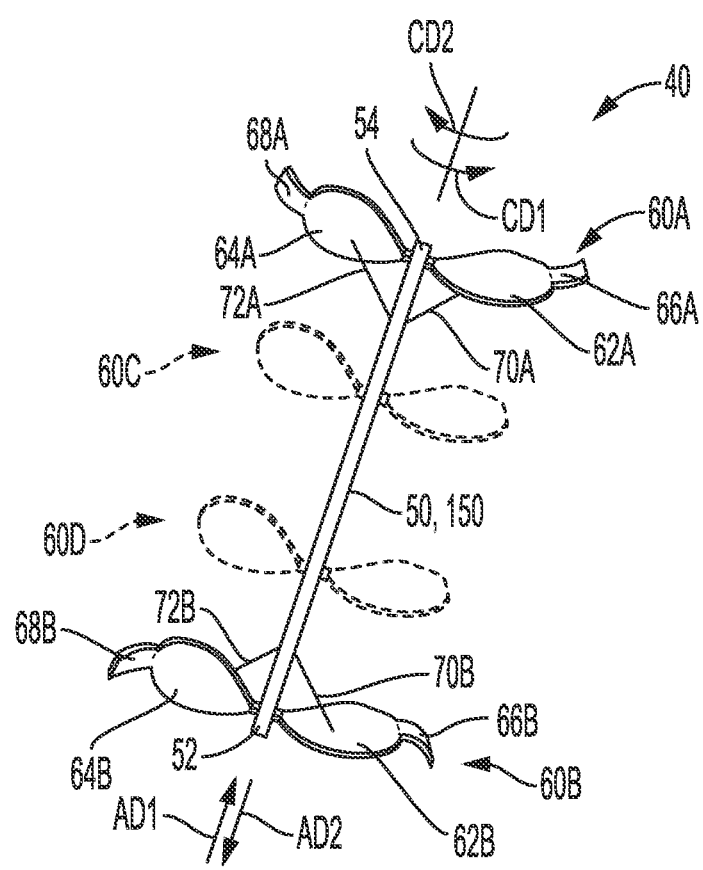
FIG. 1A is a perspective view of a hinged propeller assembly.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or a device comprising a second element and a third element.

By "non-rotatably connected" elements, we mean that: the elements are connected so that whenever one of the elements rotate, all the elements rotate; and relative rotation between the elements is not possible. Radial and/or axial movement of non-rotatably connected elements with respect to each other is possible, but not required. By "rotatably connected" elements, we mean that: the elements are rotatable with respect to each other; and whenever one element is displaced radially and/or axially, all the elements are displaced radially and/or axially.

Adverting now to the figures, FIG. 1A is a perspective view of hinged propeller assembly 40. Hinged propeller assembly 40 generally comprises driveshaft 50, 150 and at least two pluralities of blades, for example, plurality of blades 60A and plurality of blades 60B. By "plurality" it is meant that there are at least two blades. In some embodiments, hinged propeller assembly 40 further comprises plurality of blades 60C and/or plurality of blades 60D.

Driveshaft 50, 150 is generally a cylindrical shaft comprising end 52 and end 54. Driveshaft 50, 150 is operatively arranged to be connected a main shaft to transfer rotational energy, for example, via one or more gears. As an example, in some embodiments, a first bevel gear is non-rotatably connected to driveshaft 50, 150 and a second bevel gear is non-rotatably connected to the main shaft (e.g., main shaft 30A, 30B, or 30C), the second bevel gear being engaged with the first bevel gear. It should be appreciated that any suitable means for transferring rotational energy from driveshaft 50, 150 to gear drive or gear train 32 and/or generator 34 (see FIGS. 2A-B) may be used. Driveshaft 50 is a solid driveshaft (i.e., non-segmented). Driveshaft 150 is a segmented driveshaft and will be described in greater detail below.

Plurality of blades 60A are pivotably or hingedly connected to end 54. Plurality of blades 60A comprises at least blade 62A and blade 64A. Blades 62A and 64A radiate from driveshaft 50, 150 and are set at a helical spiral. When fluid flows through blades 62A and 64A in axial direction AD2, driveshaft 50, 150 rotates in a circumferential direction. Plurality of blades 60A are capable of folding radially inward in axial direction AD1, but not in axial direction AD2. Put another way, blades 62A and 64A fold radially inward in axial direction AD1 to retract (see FIG. 1B), and radially outward in axial direction AD2 to deploy (see FIGS. 1A and 1C). In the deployed position, plurality of blades 60A are arranged substantially perpendicular to driveshaft 50, 150.

In some embodiments, blades 62A and 64A comprise flared sections 66A and 68A, respectively. The curvature of flared sections 66A and 68A helps deploy blades 62A and 64A by more efficiently engaging fluid flowing in axial direction AD2. Blade 62A includes a proximal end connected to driveshaft 50, 150 and a distal end, flared section 66A being connected to the distal end. In some embodiments, flared section 66A is a curvilinear plate that curves in axial direction AD1. For example, in the deployed position of blade 62A shown in FIGS. 1A and 1C, flared section 66A curves or is concave in axial direction AD1. Blade 64A includes a proximal end connected to driveshaft 50, 150 and a distal end, flared section 68A being connected to the distal end. In some embodiments, flared section 68A is a curvilinear plate that curves in axial direction AD1. For example, in the deployed position of blade 64A shown in FIGS. 1A and 1C, flared section 68A curves or is concave in axial direction AD1.

In some embodiments, hinged propeller assembly 40 further comprises one or more biasing element, for example, biasing elements 70A and 72A, operatively arranged to bias blades 62A and 64A. As shown, biasing element 70A extends from driveshaft 50, 150 to blade 62A and biasing element 72A extends from driveshaft 50, 150 to blade 64A. In some embodiments, biasing elements 70A and 72A are operatively arranged to bias blades 62A and 64A, respectively, toward the deployed position shown in FIGS. 1A and 1C. In some embodiments, biasing elements 70A and 72A are operatively arranged to bias blades 62A and 64A, respectively, toward the retracted position shown in FIG. 1B. It should be appreciated that biasing elements 70A and 72A may comprise any suitable biasing element such as, for example, one or more springs, an elastic cord, etc.

Plurality of blades 60B are pivotably or hingedly connected to end 52. Plurality of blades 60B comprises at least blade 62B and blade 64B. Blades 62B and 64B radiate from driveshaft 50, 150 and are set at a helical spiral. When fluid flows through blades 62B and 64B in axial direction AD1, driveshaft 50, 150 rotates in a circumferential direction. Plurality of blades 60B are capable of folding radially inward in axial direction AD2, but not in axial direction AD1. Put another way, blades 62B and 64B fold radially inward in axial direction AD2 to retract (see FIG. 1C), and radially outward in axial direction AD1 to deploy (see FIGS. 1A-B). In the deployed position, plurality of blades 60B are arranged substantially perpendicular to driveshaft 50, 150.

In some embodiments, blades 62B and 64B comprise flared sections 66B and 68B, respectively. The curvature of flared sections 66B and 68B helps deploy blades 62B and 64B by more efficiently engaging fluid flowing in axial direction AD1. Blade 62B includes a proximal end connected to driveshaft 50, 150 and a distal end, flared section 66B being connected to the distal end. In some embodiments, flared section 66B is a curvilinear plate that curves in axial direction AD2. For example, in the deployed position of blade 62B shown in FIGS. 1A-B, flared section 66B curves or is concave in axial direction AD2. Blade 64B includes a proximal end connected to driveshaft 50, 150 and a distal end, flared section 68B being connected to the distal end. In some embodiments, flared section 68B is a curvilinear plate that curves in axial direction AD2. For example, in the deployed position of blade 64B shown in FIGS. 1A-B, flared section 68B curves or is concave in axial direction AD2.

In some embodiments, hinged propeller assembly 40 further comprises one or more biasing element, for example, biasing elements 70B and 72B, operatively arranged to bias blades 62B and 64B. As shown, biasing element 70B extends from driveshaft 50, 150 to blade 62B and biasing element 72B extends from driveshaft 50, 150 to blade 64B. In some embodiments, biasing elements 70B and 72B are operatively arranged to bias blades 62B and 64B, respectively, toward the deployed position shown in FIGS. 1A-B. In some embodiments, biasing elements 70B and 72B are operatively arranged to bias blades 62B and 64B, respectively, toward the retracted position shown in FIG. 1C. It should be appreciated that biasing elements 70B and 72B may comprise any suitable biasing element such as, for example, one or more springs, an elastic cord, etc.

When deployed, the front side of plurality of blades 60A faces in axial direction AD1 and the backside of plurality of blades 60A faces in axial direction AD2. When deployed, the front side of plurality of blades 60B faces in axial direction AD2 and the backside of plurality of blades 60B faces in axial direction AD1. The engagement of fluid flow with the front side of plurality of blades 60A causes driveshaft 50, 150 to displace in the same circumferential direction as the engagement of fluid flow with the front side of plurality of blades 60B. Thus, it is an object of the present disclosure to prevent engagement of fluid with the backside of plurality of blades 60B during engagement of fluid with the front side of plurality of blades 60A, and vice versa.

Figure 1B:
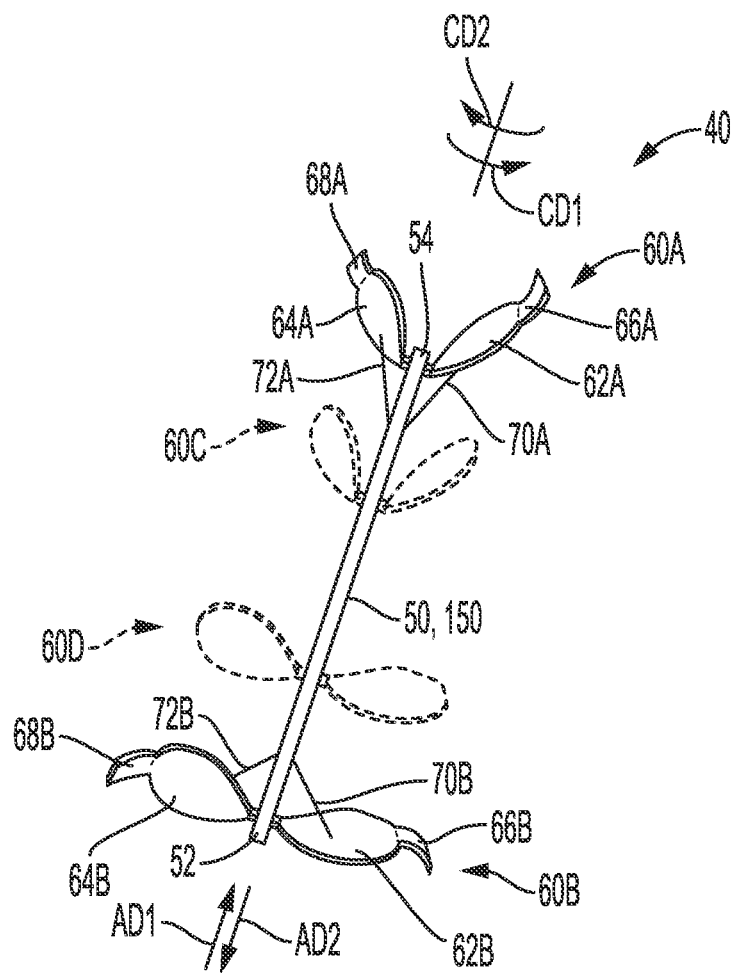
FIG. 1B is a perspective view of the hinged propeller assembly shown in FIG. 1A, in a first state.

FIG. 1B is a perspective view of hinged propeller assembly 40, in a first state. As shown, in the first state, plurality of blades 60A are in a retracted position and plurality of blades 60B are in a deployed position, which is caused by fluid flow in axial direction AD1. As fluid flows in axial direction AD1 it catches blades 62B and 64B, and flared sections 66B and 68B, causing plurality of blades 60B to fold radially outward in axial direction AD1. Also as fluid flows in axial direction AD1 it catches blades 62A and 64A causing plurality of blades 60A to fold radially inward in axial direction AD1. The retraction of plurality of blades 60A during the flow of fluid in axial direction AD1 prevents fluid engagement with the backside of plurality of blades 60A from counteracting its engagement with the front side of plurality of blades 60B.

Figure 1C:
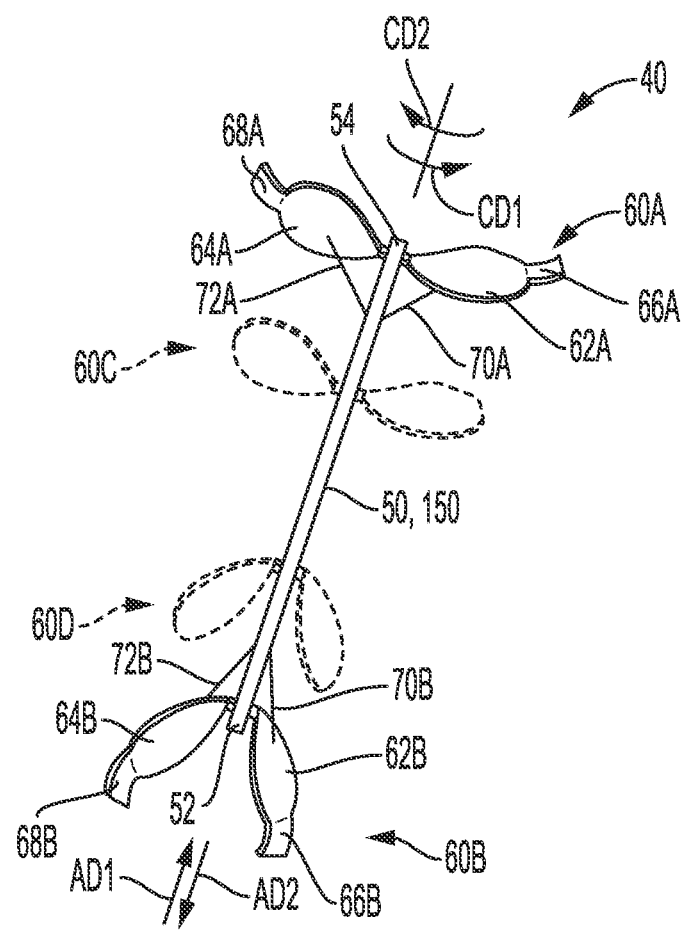
FIG. 1C is a perspective view of the hinged propeller assembly shown in FIG. 1A, in a second state.

FIG. 1C is a perspective view of hinged propeller assembly 40, in a second state. As shown, in the second state, plurality of blades 60B are in a retracted position and plurality of blades 60A are in a deployed position, which is caused by fluid flow in axial direction AD2. As fluid flows in axial direction AD2 it catches blades 62A and 64A, and flared sections 66A and 68A, causing plurality of blades 60A to fold radially outward in axial direction AD2. Also as fluid flows in axial direction AD2 it catches blades 62B and 64B causing plurality of blades 60B to fold radially inward in axial direction AD2. The retraction of plurality of blades 60B during the flow of fluid in axial direction AD2 prevents fluid engagement with the backside of plurality of blades 60B from counteracting its engagement with the front side of plurality of blades 60A.

Figure 2A:
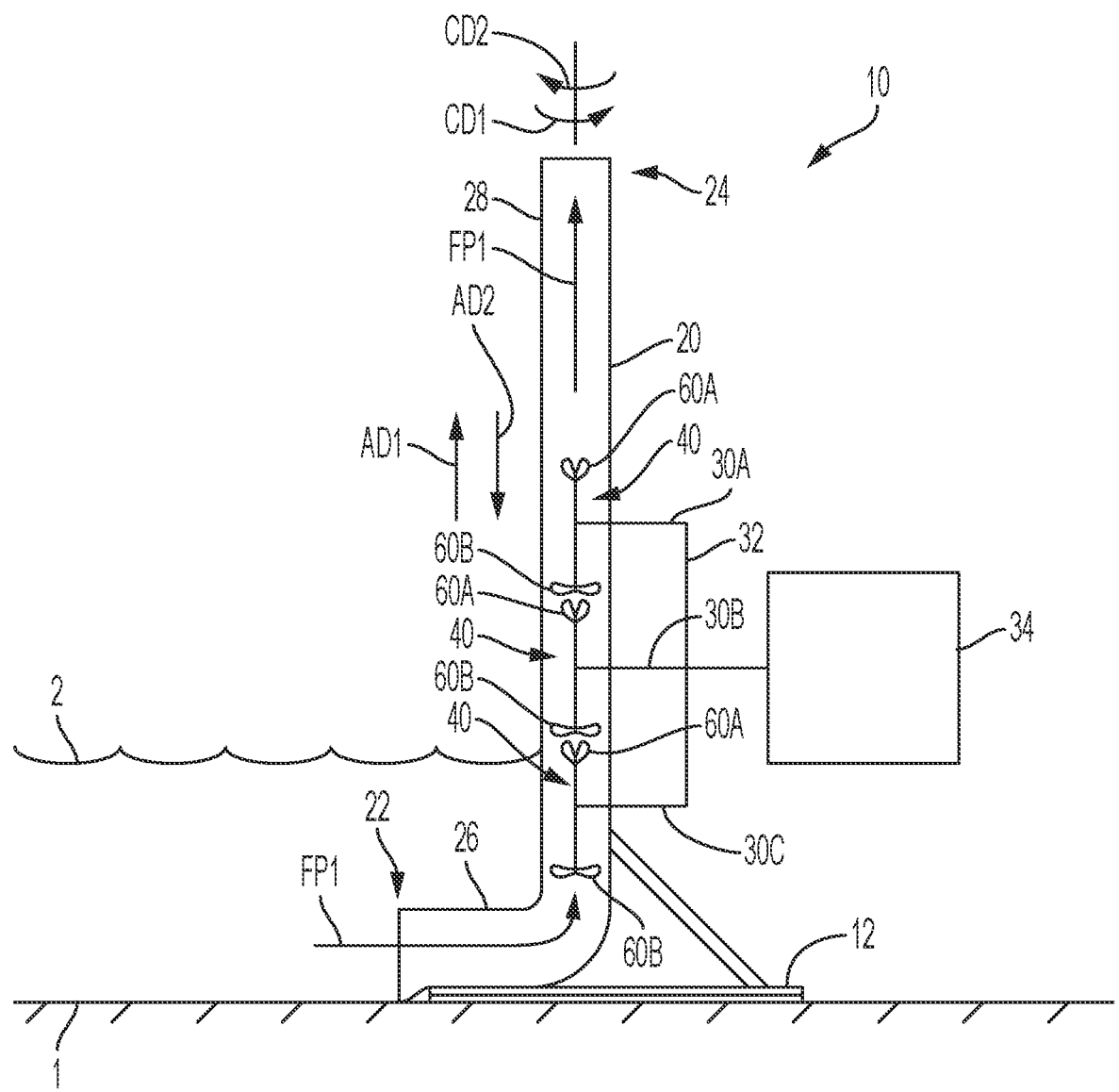
FIG. 2A is a partial elevational schematic view of an assembly for capturing oscillating fluid energy, with the hinged propeller assemblies in the first state.
Figure 2B:
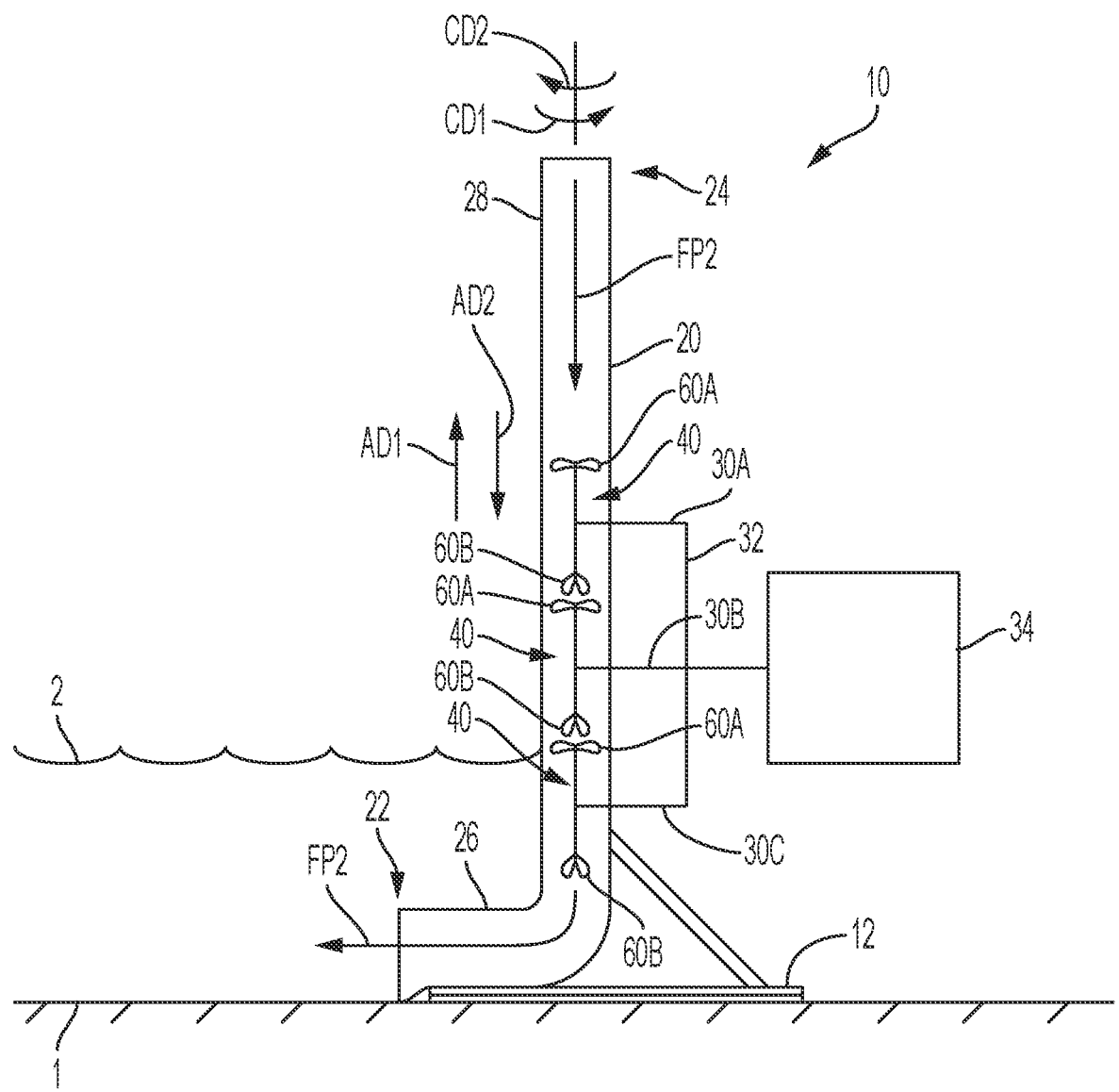
FIG. 2B is a partial elevational schematic view of the assembly for capturing oscillating fluid energy shown in FIG. 2A, with the hinged propeller assemblies in the second state.

FIG. 2A is a partial elevational schematic view of assembly for capturing oscillating fluid energy, or assembly 10, with hinged propeller assemblies 40 in the first state. FIG. 2B is a partial elevational schematic view of assembly 10, with hinged propeller assemblies 40 in the second state. Assembly 10 generally comprises tube or column 20 and one or more hinged propeller assemblies 40 (e.g., three propeller assemblies 40). Assembly 10 is operatively arranged to engage the flow of fluid. In an example embodiment, assembly 10 is arranged on or near floor 1 of a moving body of water 2 to capture the movement of body of water 1 (i.e., the ebb and flow of the tide or underwater current of the body of water).

Tube 20 comprises end or opening 22 and end 24. End 22 provides the conduit for the flow of water or fluid into and out of tube 20. Tube 20 comprises section 26, which forms end 22, and section 28 connected to section 26, section 28 forming end 24. In some embodiments, and as shown, section 28 is generally perpendicular to section 26, with section 26 arranged generally horizontally and section 28 arranged generally vertically.

As fluid flows into end 22 it flows horizontally through section 26 and up through section 28 vertically toward end 24, as indicated by flow path FP1 in FIG. 2A. Flow path FP1 causes fluid movement about hinged propeller assemblies 40 in axial direction AD1, resulting in a first state of hinged propeller assemblies 40. After fluid flows up through tube 20, or reaches its maximum height or potential energy level, it then flows down section 28 vertically, back through section 26 horizontally, and out of tube 20 through end 22, as indicated by flow path FP2 in FIG. 2B. Flow path FP2 causes fluid movement about hinged propeller assemblies 40 in axial direction AD2, resulting in a second state of hinged propeller assemblies 40.

In some embodiments, tube 20 is arranged on turn table 12 to rotatably connect tube 20 to floor 1. Turn table 12 is arranged on floor 1 and is operatively arranged to allow tube 20 to be rotated, for example, in circumferential direction CD1 or circumferential direction CD2. Such rotatability allows end 22 to be positioned to directly align with the flow of fluid. In some embodiments, turn table 12 comprises a lock that, when engaged, non-rotatably connects tube 20 to floor 1.

In some embodiments, assembly 10 further comprises one or more shafts connected to the hinged propeller assemblies 40, for example, shafts 30A-C. As previously described, shafts 30A-C are connected to respective hinged propeller assemblies 40 via any means suitable for transferring rotational power, for example, bevel gears. Thus, as hinged propeller assemblies 40 rotate so do shafts 30A-C, which puts energy into gear train 32 and converted to electrical energy by generator 34. Gear train 32 may comprise any number of shafts and gears to transfer rotational energy from shafts 30A-C to generator 34.

Figure 3:
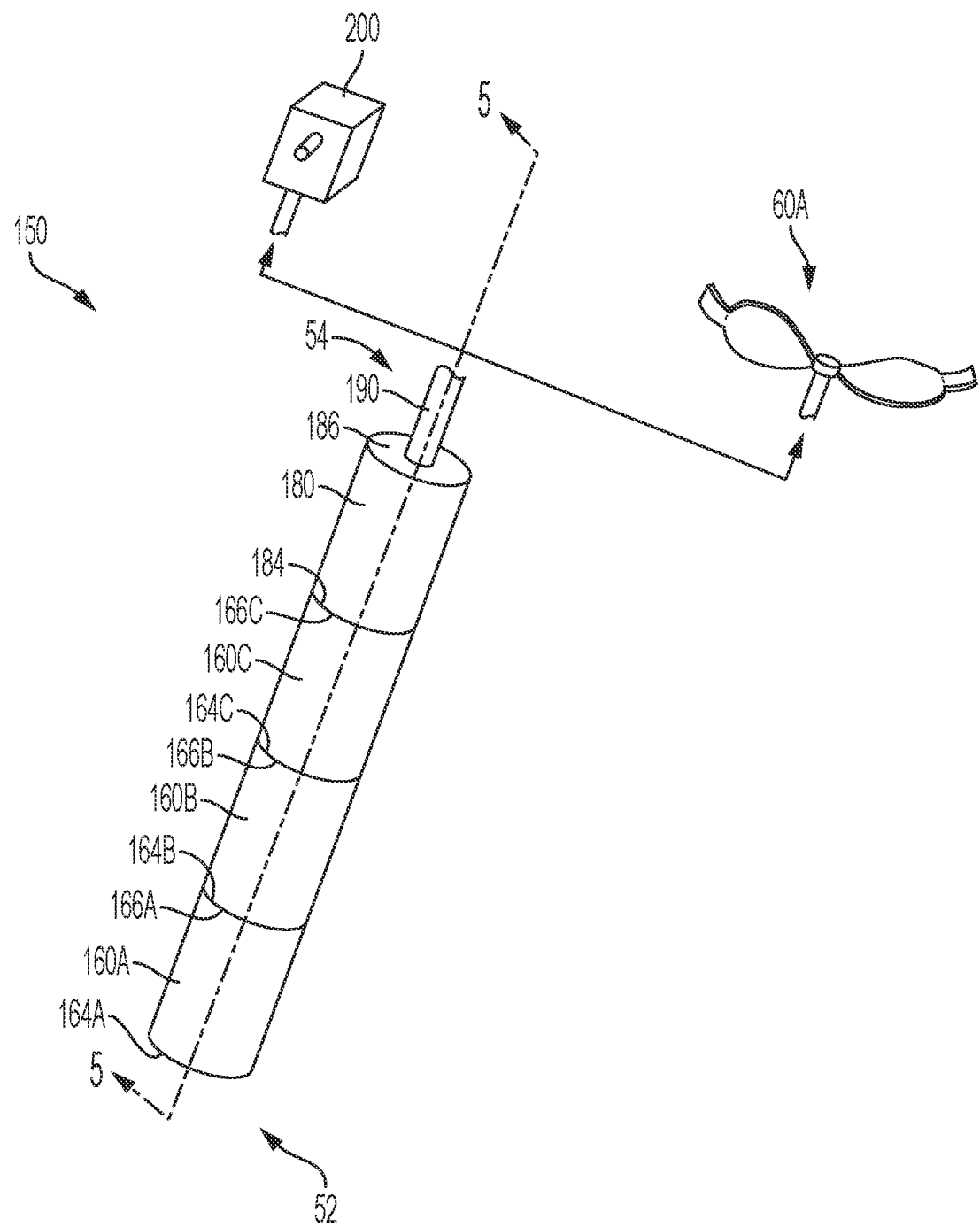
FIG. 3 is a perspective view of a segmented driveshaft.
Figure 4:
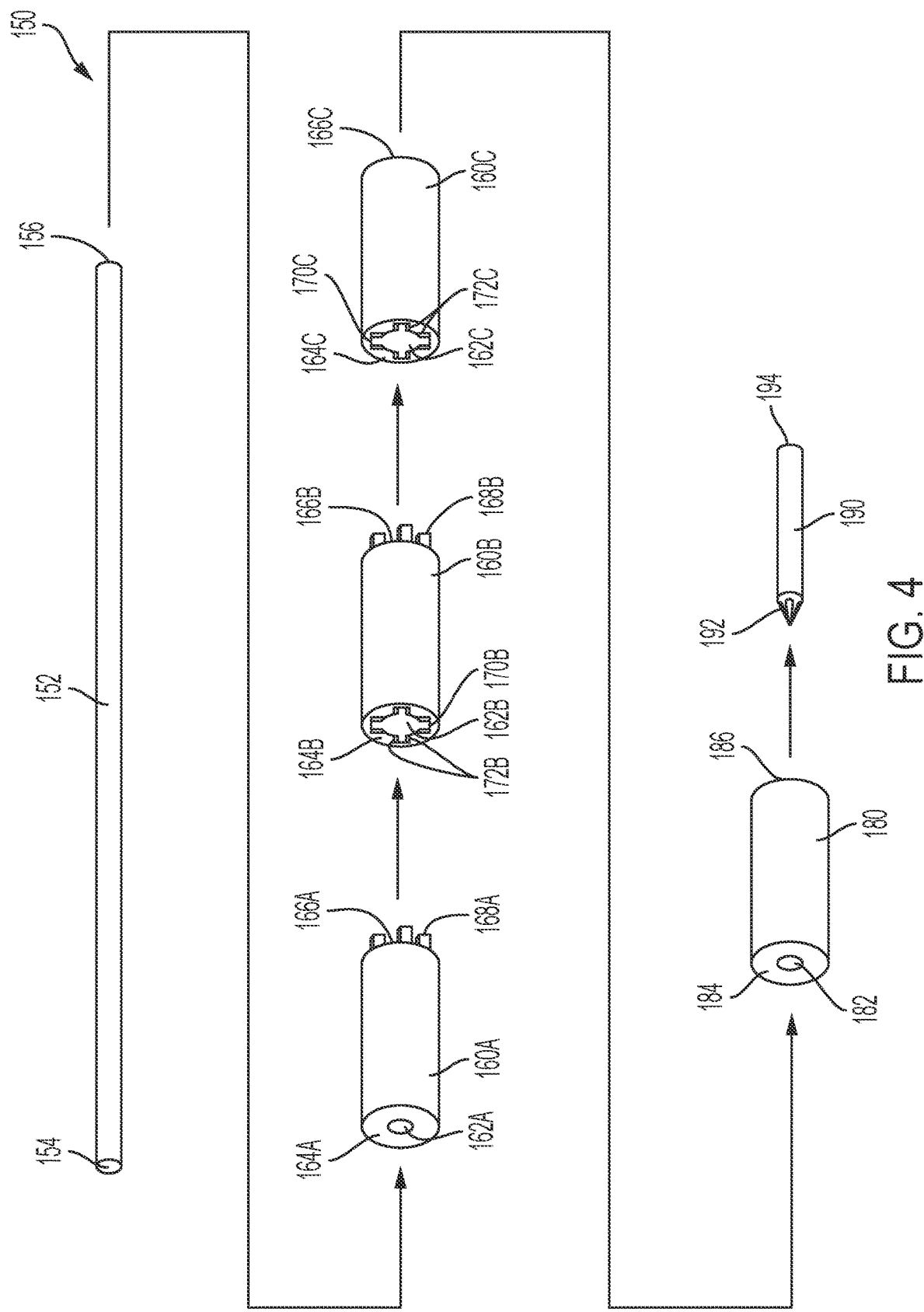
FIG. 4 is an exploded perspective view of the segmented driveshaft shown in FIG. 3.
Figure 5:
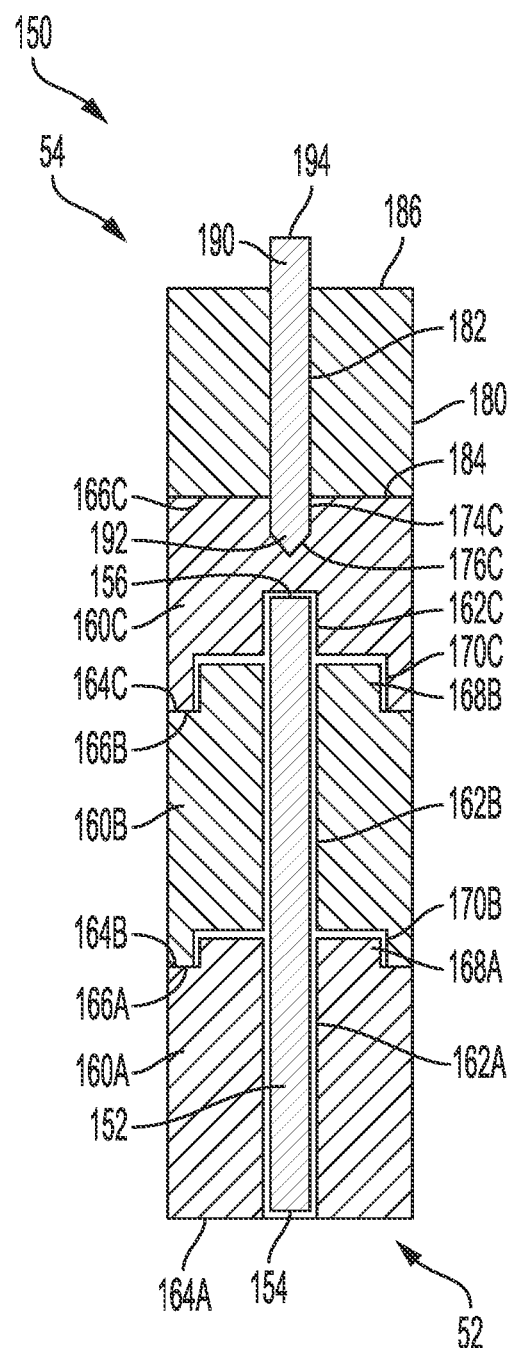
FIG. 5 is a cross-sectional view of the segmented driveshaft taken generally along line 5-5 in FIG. 3.

FIG. 3 is a perspective view of segmented driveshaft 150. FIG. 4 is an exploded perspective view of segmented driveshaft 150. FIG. 5 is a cross-sectional view of segmented driveshaft 150 taken generally along line 5-5 in FIG. 3. Segmented driveshaft 150 generally comprises a plurality of segments, for example, segments 160A-C. In some embodiments, segmented driveshaft 150 further comprises guide shaft 152. In some embodiments, segmented driveshaft 150 further comprises dampener 180 and/or connector 190. The following description should be read in view of FIGS. 1-5.

Segment 160A is cylindrical and comprises end 164A and end 166A. In some embodiments, segment 160A comprises through-bore 162A extending therethrough and operatively arranged to engage guide shaft 152. In some embodiments, segment 160A comprises a hole extending partially therethrough from end 164A and operatively arranged to engage guide shaft 152. End 166A comprises one or more protrusions 168A extending axially therefrom. Protrusions 168A are arranged adjacent or substantially adjacent to through-bore 162A, and are operatively arranged to engage notches 170B to non-rotatably connect segment 160A with segment 160B.

Segment 160B is cylindrical and comprises end 164B and end 166B. In some embodiments, segment 160B comprises through-bore 162B extending therethrough and operatively arranged to engage guide shaft 152. End 166B comprises one or more protrusions 168B extending axially therefrom. Protrusions 168B are arranged adjacent or substantially adjacent to through-bore 162B, and are operatively arranged to engage notches 170C to non-rotatably connect segment 160B with segment 160C. End 164B comprises notches 170B. Notches 170B extend radially outward from through-bore 162B. Each of notches 170B comprises two radially outward extending surfaces and one radial surface that connects the two radially outward extending surfaces. Each of the radially outward extending surfaces comprises a dampener 172B. Dampeners 172B provide radial dampening between protrusions 168A and notches 170B. As such, when protrusions 168A are engaged with notches 170B, any sudden rotational displacement of segment 160B will be dampened upon transfer to segment 160A, and vice versa. In some embodiments, dampeners 172B comprises an elastomer (e.g., rubber), a polymer, or other soft dampening material. It should be appreciated that any type and number of keyed connection that includes radial dampeners may be used. It should also be appreciated that in some embodiments, end 164B comprises the protrusions and end 166A comprises the notches.

Segment 160C is cylindrical and comprises end 164C and end 166C. In some embodiments, segment 160B comprises hole 162C extending partially therethrough from end 164C and operatively arranged to engage guide shaft 152. End 166C comprises hole 174C. Hole 174C comprises a connection means to non-rotatably connect segment 160C with connector 190, for example, female connector 176C (e.g., similar to a Phillips head screw). Connector 190 comprises end 192 operatively arranged to non-rotatably engage female connector 176C, and end 194 operatively arranged to be connected to a propeller (e.g., plurality of blades 60A or 60B or gear train or connector 200). End 192 comprises a male connector (e.g., Phillips head, hex head, Torx head, etc.) that engages a correspondingly shaped female connector 176C. By using such non-fixed connection between connector 190 and segment 160C, an sudden rotational displacement by the propeller, for example, plurality of blades 60A, will not cause connector 190 or segment 160C to break or snap. It should be appreciated that the same or a similar connection means can be implemented at end 164A of segment 160A for, for example, connection of end 52 to plurality of blades 60B. End 164C comprises notches 170C. Notches 170C extend radially outward from hole 162C. Each of notches 170C comprises two radially outward extending surfaces and one radial surface that connects the two radially outward extending surfaces. Each of the radially outward extending surfaces comprises a dampener 172C. Dampeners 172C provide radial dampening between protrusions 168B and notches 170C. As such, when protrusions 168B are engaged with notches 170C, any sudden rotational displacement of segment 160C will be dampened upon transfer to segment 160B, and vice versa. In some embodiments, dampeners 172C comprises an elastomer (e.g., rubber), a polymer, or other soft dampening material. It should be appreciated that any type and number of keyed connection that includes radial dampeners may be used. It should also be appreciated that in some embodiments, end 164C comprises the protrusions and end 166B comprises the notches.

In some embodiments, dampener 180 is arranged circumferentially around connector 190 and axially between segment 160C and the propeller, for example, plurality of blades 60A, plurality of blades 60B, or gear train 200. Dampener 180 comprises end 184 arranged to abut against end 184 and end 186 arranged to engage the propeller or a portion of connector 190 proximate to end 194. Dampener comprises through-bore 182 arranged to engage connector 190. Dampener 180 is operatively arranged to dissipate, or dampen, any bending moment at end 54 of segmented driveshaft 150. For example, as moving fluid interacts with the blades of the propeller, a bending moment is exerted upon end 54. Dampener 180 helps dissipate the force thereby preventing or reducing the risk of segmented driveshaft 150 breaking. Dampener 180 may comprise any material suitable for dissipating the bending moment force, for example, an elastomer, a polymer, foam, or any other soft and/or elastically deformable material. It should be appreciated that, in some embodiments of segmented driveshaft 150, the propeller (e.g., set of blades 60A or 60B or geartrain 200) is connected directly to segment 160C, and connector 190 and dampener 180 are not included.

In some embodiments, guide shaft 152 extends at least partially through segment 160A, segment 160B, and segment 160C, namely, hole 162A, through-bore 162B, and hole 162C, respectfully. Guide shaft 152 is operatively arranged to aid in axial connection and alignment between the segments of segmented driveshaft 150. Guide shaft 152 may also maintain axial connection between such segments. For example, guide shaft 152 comprises end 154 rotatably connected to segment 160A and end 156 rotatably connected to segment 160C.

Segmented driveshaft 150 may comprise any number of segments. In some embodiments, and as previously described end 54 is connected to a propeller (e.g., plurality of blades 60A) and end 52 is connected to a propeller (e.g., plurality of blades 60B). In some embodiments, end 52 is connected to a gear train.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

1 Floor
2 Water
10 Assembly for capturing oscillating fluid energy
12 Turn table
20 Tube or column
22 End or opening
24 End
26 Section
28 Section
30A Main shaft
30B Main shaft
30C Main shaft
32 Gear drive or gear train
34 Generator
40 Hinged propellor assembly
50 Driveshaft
52 End
54 End
60A Plurality of blades
60B Plurality of blades
60C Plurality of blades
60D Plurality of blades
62A Blade
62B Blade
64A Blade
64B Blade
66A Flared section
66B Flared section
68A Flared section
68B Flared section
70A Biasing element
70B Biasing element
72A Biasing element
72B Biasing element
150 Driveshaft
152 Guide shaft
154 End
156 End
160A Segment
160B Segment
160C Segment
162A Through-bore
162B Through-bore 162C Hole
164A End
164B End
164C End
166A End
166B End
166C End
168A Protrusions
168B Protrusions
170B Notches
170C Notches
172B Dampener(s)
172C Dampener(s)
174C Hole
176C Female connector
180 Dampener
182 Through-bore
184 End
186 End
190 Connector
192 End
194 End
200 Connector or gear train
AD1 Axial direction
AD2 Axial direction
CD1 Circumferential direction
CD2 Circumferential direction
FP1 Flow path
FP2 Flow path

What is claimed is:

1. A driveshaft, comprising:
a first segment, including:
   a first end;
   a second end;
   a first through-bore extending from the first end to the second end; and
   a first protrusion extending axially from the second end; and
a second segment, including:
   a third end comprising a first notch, the first notch including at least one dampener;
   a fourth end; and
   a first hole extending from the third end and aligned with the first through-bore;
wherein:
   the first protrusion engages the first notch to non-rotatably connect the first segment and the second segment; and
   the at least one dampener provides radial dampening between the first segment and the second segment.

2. The driveshaft as recited in claim 1, wherein the second segment further comprises a second hole extending from the fourth end.

3. The driveshaft as recited in claim 2, wherein the second segment further comprises a female connector arranged in the second hole.

4. The driveshaft as recited in claim 3, further comprising a connector shaft engaged with the female connector.

5. The driveshaft as recited in claim 4, wherein the connector shaft is operatively arranged to non-rotatably connect the second segment to one or more propeller blades or a gear train.

6. The driveshaft as recited in claim 4, further comprising a dampener segment arranged circumferentially around the connector shaft, the dampener segment comprising a fifth end and a sixth end.

7. The driveshaft as recited in claim 6, wherein the fifth end abuts against the fourth end.

8. The driveshaft as recited in claim 1, further comprising a guide shaft engaged with the first through-bore and the first hole.

9. The driveshaft as recited in claim 1, wherein the first notch extends radially outward from the first hole.

10. The driveshaft as recited in claim 9, wherein the first notch extends axially from the third end.

11. The driveshaft as recited in claim 10, wherein:
the first notch comprises a first surface and a second surface opposite the first surface;
a first dampener is arranged on the first surface; and
a second dampener is arranged on the second surface.

12. The driveshaft as recited in claim 11, wherein the first dampener and the second dampener provide radial dampening between the first protrusion and the first notch.

13. The driveshaft as recited in claim 1, wherein the at least one dampener comprises an elastomer.

14. The driveshaft as recited in claim 1, wherein the at least one dampener comprises a polymer.

15. The driveshaft as recited in claim 1, further comprising a third segment including:
a fifth end;
a sixth end;
a second through-bore extending from the fifth end to the sixth end; and
a second protrusion extending axially from the sixth end, wherein the second protrusion engages a second notch in the first end to non-rotatably connect the third segment to the first segment.

16. A driveshaft comprising:
a first segment, including:
   a first end;
   a second end;
   a first through-bore extending from the first end to the second end; and
   a first protrusion extending axially from the second end; and
a second segment, including:
   a third end comprising a first notch;
   a fourth end; and
   a first hole extending from the third end and aligned with the first through-bore;
wherein:
   the first protrusion engages the first notch to non-rotatably connect the first segment and the second segment; and
   the first notch comprises at least one dampener that radially surrounds the engaged first protrusion.

17. The driveshaft as recited in claim 16, further comprising a connector shaft non-rotatably engaged with the fourth end.

18. The driveshaft as recited in claim 17, further comprising a dampener segment arranged circumferentially around the connector shaft, the dampener segment comprising a fifth end abutting against the fourth end and a sixth end.

19. The driveshaft as recited in claim 16, further comprising a guide shaft engaged with the first through-bore and the first hole.

20. A driveshaft, comprising:
a first segment, including:
   a first end;
   a second end;
   a through-bore extending from the first end to the second end; and
   a protrusion extending axially from the second end; and a second segment, including:
  a third end;
  a fourth end;
  a hole extending from the third end and aligned with the through-bore;
  a notch extending axially from the third end and radially outward from the hole, the notch comprising:
    a first radially outward extending surface including a first dampener; and
    a second radially outward extending surface, spaced apart from the first radially outward extending surface, the second radially outward extending surface including a second dampener;
wherein the protrusion engages the notch circumferentially between the first dampener and the second dampener to non-rotatably connect the first segment and the second segment.

\* \* \* \* \*